US010975286B2

(12) United States Patent
Funkhouser et al.

(10) Patent No.: US 10,975,286 B2
(45) Date of Patent: *Apr. 13, 2021

(54) CEMENT SLURRIES WITH SALT-TOLERANT FLUID LOSS ADDITIVES AND METHODS RELATING THERETO

(71) Applicant: Halliburton Energy Services, Inc., Houston, TX (US)

(72) Inventors: Gary P. Funkhouser, Roman Forest, TX (US); Samuel J. Lewis, Spring, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/313,364

(22) PCT Filed: Aug. 28, 2014

(86) PCT No.: PCT/US2014/053225
§ 371 (c)(1),
(2) Date: Nov. 22, 2016

(87) PCT Pub. No.: WO2016/032494
PCT Pub. Date: Mar. 3, 2016

(65) Prior Publication Data
US 2017/0183558 A1 Jun. 29, 2017

(51) Int. Cl.
C09K 8/487 (2006.01)
C04B 28/02 (2006.01)
C09K 8/467 (2006.01)
E21B 33/13 (2006.01)

(52) U.S. Cl.
CPC .............. C09K 8/487 (2013.01); C04B 28/02 (2013.01); C09K 8/467 (2013.01); E21B 33/13 (2013.01); Y02W 30/91 (2015.05)

(58) Field of Classification Search
CPC .......... C09K 8/467; C09K 8/487; C09K 8/46; C09K 8/40; C09K 8/48; C09K 8/5045; C09K 8/424; C09K 8/473; C09K 8/035; C09K 8/16; C09K 8/426; C09K 8/428; C09K 8/90; C09K 2208/10; C09K 8/032; C09K 8/665; C09K 8/68; C09K 8/42; C09K 8/882; C09K 8/92; C09K 2208/00; C09K 2208/04; C09K 2208/08; C09K 2208/12; C09K 2208/32; C09K 8/03; C09K 8/08; C09K 8/10; C09K 8/36; C09K 8/44; C09K 8/502; C09K 8/516; C09K 8/528; C09K 8/58; C09K 8/60; C09K 8/62; C09K 8/685; C09K 8/70; C09K 8/76; C09K 8/80; C09K 8/845; C09K 8/887; E21B 33/13; E21B 33/14; E21B 33/138; E21B 43/243; E21B 43/267; E21B 7/20; E21B 21/003; E21B 33/134; E21B 43/16; E21B 43/25; E21B 43/261; E21B 47/0005; E21B 47/102
See application file for complete search history.

(56) References Cited

U.S. PATENT DOCUMENTS

| | | | |
|---|---|---|---|
| 4,640,942 A | 2/1987 | Brothers | |
| 4,703,801 A | 11/1987 | Fry et al. | |
| 5,132,285 A | 7/1992 | Tsai | |
| 5,309,999 A * | 5/1994 | Cowan | C04B 7/52 106/790 |
| 5,510,436 A | 4/1996 | Hille et al. | |
| 6,395,853 B1 | 5/2002 | Oswald et al. | |
| 2003/0083204 A1 | 5/2003 | Chatterji et al. | |
| 2004/0187740 A1 | 9/2004 | Timmons | |
| 2005/0000734 A1 | 1/2005 | Getzlaf et al. | |
| 2008/0045420 A1* | 2/2008 | Karagianni | C08F 246/00 507/121 |
| 2008/0066652 A1* | 3/2008 | Fraser | C04B 28/04 106/709 |
| 2010/0093874 A1* | 4/2010 | Monin | C08F 220/60 514/772.4 |
| 2010/0155069 A1 | 6/2010 | Morgan et al. | |
| 2011/0028593 A1 | 2/2011 | Roddy et al. | |
| 2011/0048709 A1 | 3/2011 | Patil et al. | |

(Continued)

FOREIGN PATENT DOCUMENTS

EP 1375819 A1 1/2004
KR 20970045259 A 5/2007

(Continued)

OTHER PUBLICATIONS https://encyclopedia2.thefreedictionary.com/Subterranean+Water downloaded on Jul. 10, 2018.*

(Continued)

Primary Examiner — Kumar R Bhushan
(74) Attorney, Agent, or Firm — Thomas Rooney; C. Tumey Law Group PLLC

(57) ABSTRACT

A cement slurry suitable for use in the presence of high salt concentrations may include a base fluid and dry components that include: a cementitious material, a pozzolanic material, a salt additive, and a salt-tolerant fluid loss additive. The salt-tolerant fluid loss additive may be at least one of the following zwitterionic polymers: (1) a copolymer of at least one anionic monomer and at least one cationic monomer, (2) a copolymer of at least one anionic monomer, at least one cationic monomer, and at least one zwitterionic monomer, (3) a homopolymer of a zwitterionic monomer, or (4) a copolymer of at least one zwitterionic monomer.

13 Claims, 1 Drawing Sheet

(56) References Cited

U.S. PATENT DOCUMENTS

| | | |
|---|---|---|
| 2012/0172518 A1 | 7/2012 | Roddy et al. |
| 2013/0075096 A1* | 3/2013 | Khalfallah .......... C04B 24/2652 166/294 |
| 2013/0217603 A1 | 8/2013 | Jamison et al. |

FOREIGN PATENT DOCUMENTS

| | | | |
|---|---|---|---|
| WO | 01-06999 A1 | | 2/2001 |
| WO | WO01/06999 | * | 2/2001 |
| WO | WO 01/06999 | * | 2/2001 |
| WO | 2012061147 A1 | | 5/2012 |
| WO | 2014052182 A1 | | 4/2014 |
| WO | WO2014/052182 | * | 4/2014 |
| WO | WO 2014/052182 | * | 4/2014 |
| WO | 2016032494 A1 | | 3/2016 |

OTHER PUBLICATIONS https://www.britannica.com/ science/brine downloaded on Feb. 15, 2019.*

Product data sheet [3-(Methacryloylamino)propyl]dimethyl(3-sulfopropyl)ammonium hydroxide inner salt, downloaded on Nov. 3, 2019.* https://www.concrete.org/tools/frequentlyaskedquestions.aspx?faqid=686 downloaded on Aug. 24, 2020.* http://www.waterencyclopedia.com/Bi-Ca/Brines-Natural.html downloaded on Aug. 24, 2020.*

Ansi/Api Recommended Practice 10B-5, First Edition, Apr. 2005, Recommended Practice on Determination of Shrinkage and Expansion of Well Cement Formulations at Atmospheric Pressure, ISO 10426-5:2004 (Identical), Petroleum and natural gas industries-Cements and materials for well cementing—Part 5: Determination of shrinkage and expansion of well cement formulations at atmospheric pressure.

Ansi/Api Recommended Practice 10B-2, Section 10, First Edition, Jul. 2005, Recommended Practice for Testing Well Cements, ISO 10426-2:2003 (Identical), Petroleum and natural gas industries—Cements and materials for well cementing—Part 2: Testing of Well Cements, Amendment 1: Water-wetting capability testing.

Ansi/Api Recommended Practice 10B-2, Section 15, First Edition, Jul. 2005, Recommended Practice for Testing Well Cements, ISO 10426-2:2003 (Identical), Petroleum and natural gas industries—Cements and materiais for well cementing—Part 2: Testing of Well Cements, Amendment 1: Water-wetting capabiiity testing.

International Search Report and Writien Opinion for PCT/US2014/053225 dated Apr. 20, 2015.

Schlumberger Oilfield Glossary—Brine, Retrieved on Apr. 16, 2019.

"Drilling Through Salt Foramtions: A Drilling Fluids Review" Amer et al. Dated Sep. 14, 2016.

* cited by examiner

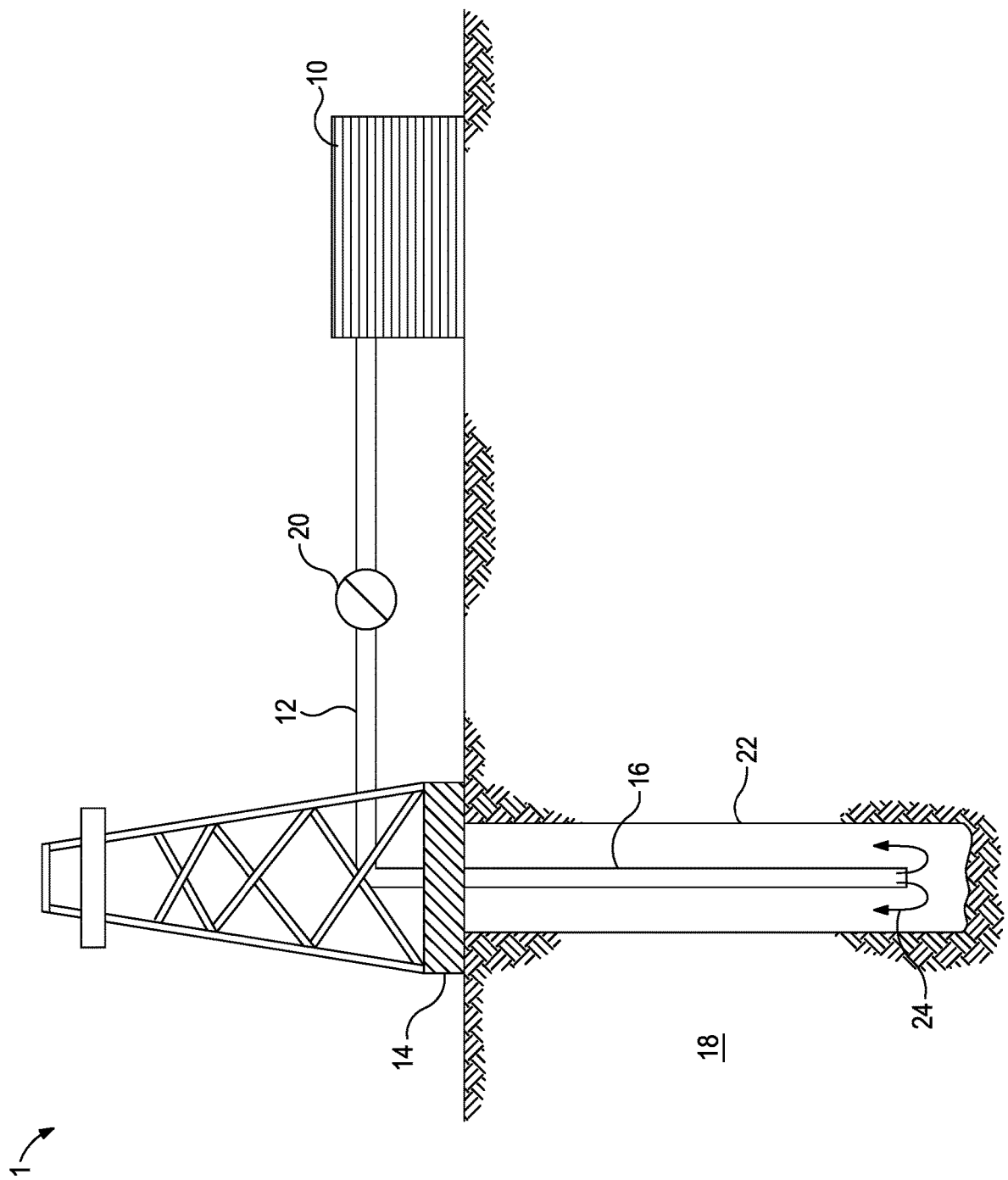

CEMENT SLURRIES WITH SALT-TOLERANT FLUID LOSS ADDITIVES AND METHODS RELATING THERETO

BACKGROUND

The embodiments described herein relate to methods and compositions for use in cementing operations.

Hydraulic cement compositions are commonly used in subterranean operations, particularly completion and remedial operations. For example, hydraulic cement compositions are used in primary cementing operations whereby pipe strings such as casings and liners are cemented in wellbores. For example, in performing primary cementing, cement slurries that include hydraulic cement may be pumped into the annular space between the walls of a wellbore and the exterior surface of the pipe string disposed therein. The cement slurry is then permitted to set in the annular space, thereby forming a cement sheath that aids in supporting and positioning the pipe string in the wellbore and bonds the exterior surfaces of the pipe string to the walls of the wellbore. In another example, cement slurries that include hydraulic cement may also be used in remedial cementing operations such as plugging highly permeable zones or fractures in wellbores, plugging cracks and holes in pipe strings, and the like.

In many instances, a cement slurry may include a fluid loss control additive. As used herein, the term "fluid loss" refers to the undesirable migration or loss of fluids from the wellbore into a subterranean formation. Relative to a cement slurry, excessive fluid loss may, inter alia, cause the cement slurry to prematurely dehydrate, which may limit the amount of cement composition that can be pumped, decrease the compressive strength of the cement composition, and negatively impact bond strength between the set cement composition and a subterranean formation, the walls of the pipe string, and/or the walls of the wellbore.

However, the efficacy of traditional fluid loss additives, like copolymers of N,N-dimethylacrylamide and 2-acrylamido-2-methylpropanesulfonic acid, can be greatly reduced with increasing salt concentration, especially magnesium salts. Salt is encountered in many oil-producing regions as, for example, salt domes in the formation and salt water in the formation. To counteract the efficacy reduction of a traditional fluid loss additive, the concentration of the fluid loss additive is usually increased. However, such increased amounts of the fluid loss additive may adversely affect cement slurry properties since these additives can also act as retarders and viscosifiers.

BRIEF DESCRIPTION OF THE DRAWINGS

The following FIGURE is included to illustrate certain aspects of the embodiments described herein, and should not be viewed as exclusive embodiments. The subject matter disclosed is capable of considerable modifications, alterations, combinations, and equivalents in form and function, as will occur to those skilled in the art and having the benefit of this disclosure.

FIG. 1 depicts an embodiment of a system configured for delivering salt-tolerant cement slurries to a downhole location according to at least some embodiments described herein.

DETAILED DESCRIPTION

The embodiments described herein relate to methods and compositions for use in cementing operations. Specifically, the embodiments herein relate to salt-tolerant fluid loss additives that may be useful in producing a cement slurry.

The salt-tolerant fluid loss additives described herein include zwitterionic polymers that provide fluid loss for cement slurries at moderate concentrations while in the presence of high salt concentrations. Additionally, salt-tolerant fluid loss additives described herein may be effective in the presence of magnesium salts. The ability to use moderate concentrations of the salt-tolerant fluid loss additives described herein may, in turn, minimally effect the properties of the cement slurry and resultant set cement.

Cement slurries described herein may include a base fluid, a salt-tolerant fluid loss additive, a cementitious material, a pozzolanic material, and a salt additive. Optionally, the cement slurry may further include an elastomer, a weighting agent, a fluid loss intensifier, a strength-stabilizing agent, a dispersant, a defoaming agent, or any combination thereof.

The zwitterionic polymers of salt-tolerant fluid loss additives described herein may be (1) copolymers of at least one anionic monomer and at least one cationic monomer, (2) copolymers of at least one anionic monomer, at least one cationic monomer, and at least one zwitterionic monomer, (3) homopolymers of a zwitterionic monomer, or (4) copolymers of at least one zwitterionic monomer. As used herein, the term "copolymer" is not limited to polymers comprising two types of monomeric units, but includes any combination of polymers (e.g., terpolymers, tetrapolymers, and the like). In some instances, a salt-tolerant fluid loss additive described herein may include one or more of the foregoing zwitterionic polymers.

In some instances, the zwitterionic polymers of salt-tolerant fluid loss additives may be charge balanced to a net zero charge. For example, in a copolymer of a monovalent cationic monomer and monovalent anionic monomer, the monovalent cationic monomer and the monovalent anionic monomer may be present in the copolymer in equimolar amounts.

Examples of anionic monomers suitable for producing zwitterionic polymers may include, but are not limited to, 2-acrylamido-2-methylpropanesulfonic acid ("2A2MPS"), sodium 2-acrylamido-2-methylpropanesulfonate ("sodium 2A2MPS"), 4-vinylbenzenesulfonic acid, sodium 4-vinylbenzenesulfonate, vinylsulfonic acid, sodium vinylsulfonate, allylsulfonic acid, sodium allylsulfonate, 3-sulfopropyl acrylate potassium salt, 3-sulfopropyl methacrylate potassium salt, N-sulfomethylacrylamide sodium salt, sodium 1-allyloxy-2-hydroxypropanesulphonate, and the like. The foregoing sodium salts may include alternate counterions of potassium, magnesium, calcium, ammonium, and the like.

Examples of cationic monomers suitable for producing zwitterionic polymers may include, but are not limited to, [2-(methacryloyloxy)ethyl]trimethylammonium chloride, [3-(methacryloylamino)propyl]trimethylammonium chloride, [2-(acryloyloxy)ethyl]trimethylammonium chloride, [3-(acryloylamino)propyl]trimethylammonium chloride, [2-(methacryloyloxy)ethyl]dimethylamine hydrochloride, [3-(methacryloylamino)propyl]dimethylamine hydrochloride, [2-(acryloyloxy)ethyl]dimethylamine hydrochloride, [3-(acryloylamino)propyl]dimethylamine hydrochloride, dimethyldiallylammonium chloride, and the like. The foregoing chloride salts may include alternate counterions of bromide, sulfate, methyl sulfate, ethyl sulfate, nitrate, and the like.

Examples of zwitterionic monomers suitable for producing zwitterionic polymers may include, but are not limited to, [3-(methacryloylamino)propyl]dimethyl(3-sulfopropyl) ammonium hydroxide inner salt, [2-(methacryloyloxy)

ethyl]dimethyl(3-sulfopropyl)ammonium hydroxide inner salt, 2-(methacryloyloxy)ethyl 2-(trimethylammonio)ethyl phosphate, and the like.

In some embodiments, a salt-tolerant fluid loss additive may be included in a cement slurry in an amount ranging from a lower limit of about 0.001%, 0.01%, 0.1%, 0.2%, 0.4%, 0.6%, 0.8%, 1%, 1.2%, 1.4%, or 1.6% by weight of the complete dry components of the cement slurry to an upper limit of about 3%, 2.8%, 2.6%, 2.4%, 2.2%, 2%, 1.8%, or 1.6% by weight of the complete dry components of the cement slurry, wherein the amount of the salt-tolerant fluid loss additive may range from any lower limit to any upper limit and encompasses any subset therebetween. In some preferred embodiments, the salt-tolerant fluid loss additive may be present in an amount of about 0.2% to about 3% by weight of the complete dry components of the cement slurry. As used herein, the term "dry components of the cement slurry" refers to the solid or dry components and typically include all components of the cement slurry except the base fluid.

A fluid loss intensifier described herein may operate synergistically with a salt-tolerant fluid loss additive to facilitate fluid loss control. Examples of fluid loss intensifiers may include, but are not limited to, 2-acrylamido-2-methylpropanesulfonic acid, N,N-dimethyl acrylamide, acrylamide terpolymer, copolymers thereof, any derivatives thereof, and any combination thereof.

In some embodiments, a fluid loss intensifier may be included in a cement slurry in an amount ranging from a lower limit of about 0%, 0.001%, 0.01%, 0.05%, 0.1%, 0.2%, 0.3%, 0.4%, 0.5%, 0.6%, 0.7%, 0.8%, 0.9%, or 1% by weight of the complete dry components of the cement slurry to an upper limit of about 2%, 1.9%, 1.8%, 1.7%, 1.6%, 1.5%, 1.4%, 1.3%, 1.2%, or 1% by weight of the complete dry components of the cement slurry, wherein the amount of the fluid loss intensifier may range from any lower limit to any upper limit and encompasses any subset therebetween.

The cementitious material described herein may be any cementitious material suitable for use in subterranean operations. In preferred embodiments, the cementitious material is a hydraulic cement. Hydraulic cements harden by the process of hydration due to chemical reactions to produce insoluble hydrates (e.g., calcium silicate hydrates) that occur in the presence of water. Thus, hydraulic cements are preferred because they are capable of hardening even when submerged in water. Suitable hydraulic cements include, but are not limited to Portland cement, Portland cement blends (e.g., Portland blast-furnace slag cement and/or expansive cement), non-Portland hydraulic cement (e.g., super-sulfated cement, calcium aluminate cement, sulfoaluminate cement, and/or high magnesium-content cement), and the like, and any combination thereof.

In some embodiments, cementitious materials may be included in a cement slurry in an amount ranging from a lower limit of about 5%, 10%, 15%, 20%, 25%, 30%, or 35% by weight of the complete dry components of the cement slurry to an upper limit of about 60%, 55%, 50%, 45%, 40%, or 35% by weight of the complete dry components of the cement slurry, wherein the amount of the cementitious materials may range from any lower limit to any upper limit and encompasses any subset therebetween.

The pozzolanic material may aid in reducing the amount of Portland cement needed. As used herein the term "pozzolanic material" refers to a siliceous material that, while not being cementitious, is capable of reacting with calcium hydroxide (which may be produced during hydration of a cementitious material) in the presence of water to form a material possessing the qualities of cementitious material. Because calcium hydroxide accounts for a sizable portion of most hydrated hydraulic cements and because calcium hydroxide does not contribute to the cement's desirable properties, the combination of cementitious and pozzolanic materials may synergistically enhance the strength and quality of the cement. Any pozzolanic material that is reactive with the cementitious material may be used in the methods and compositions of the embodiments described herein. Suitable pozzolanic materials include, but are not limited to silica fume, metakaolin, fly ash, diatomaceous earth, calcined or uncalcined diatomite, calcined fullers earth, pozzolanic clays, calcined or uncalcined volcanic ash, bagasse ash, pumice, pumicite, rice hull ash, natural and synthetic zeolites, slag, vitreous calcium aluminosilicate, and any combination thereof. Preferred pozzolanic materials may include, but are not limited to, silica fume, fly ash, and slag, as they are particularly reactive.

In some embodiments, pozzolanic materials may be included in a cement slurry in an amount ranging from a lower limit of about 0.001%, 0.01%, 0.1%, 5%, 10%, 15%, 20%, 25%, or 30% by weight of the complete dry components of the cement slurry to an upper limit of about 60%, 50% 40%, 35%, or 30% by weight of the complete dry components of the cement slurry, wherein the amount of the pozzolanic materials may range from any lower limit to any upper limit and encompasses any subset therebetween.

A salt additive described herein may serve a dual purpose. First, the salt additive may slow the dissolution of formation salts into the cement slurry. Second, the salt additive may act as a dispersant to limit the undesirable viscosification from the precipitation of magnesium hydroxide when magnesium chloride (present in some formation salts) reacts with the high-pH cement slurry. The salt additive may be any simple salt compatible with use in a subterranean formation. In preferred embodiments, a salt additive may include, but is not limited to, sodium chloride, potassium chloride, or a combination thereof.

In some embodiments, a salt additive may be included in a cement slurry in an amount ranging from a lower limit of about 15%, 18%, 20%, 22%, 24%, 26%, 28%, or 30% by weight of the base fluid of the cement slurry to an upper limit of about 40%, 38%, 36%, 34%, 32%, or 30% by weight of the base fluid of the cement slurry, wherein the amount of the salt additive may range from any lower limit to any upper limit and encompasses any subset therebetween. In preferred embodiments, the salt additive may be present in an amount of about 18% to about 40% by weight of the base fluid of the cement slurry. In even more preferred embodiments, the salt additive may be present in an amount of about 36% by weight of the base fluid of the cement slurry.

The elastomers described herein may be used to impart elasticity to the set cement produced from the cement slurries described herein. In some embodiments, the elastomers may swell upon contact with water and/or oil (e.g., up to 500% of their original size). Such swelling may aid in maintaining zonal isolation in salt formations, for example, by swelling when contacted with water and/or oil to seal void spaces or cracks in set cement. In preferred embodiments, the elastomer swells upon contact with oil. The elastomers may additionally be weighted using a weighting agent. Weighting agents are typically materials that weigh more than water and may be used to increase the density of an elastomer. Suitable weighting agents may include, but are not limited to, hematite, hausmannite, barite, sand, $MnO_2$, and any combination thereof. Suitable swellable and weighted elastomers and their methods of use can be found in U.S. Patent Pub. No. 2011/0028593, filed Jul. 29, 2009.

Generally, the elastomers of the embodiments herein may be used in particulate form. As used herein, the term "particulate" refers to materials in solid state having a well-defined physical shape, including regular and irregular geometries. Elastomers may have the shape of, for example, platelets, shavings, fibers, flakes, ribbons, rods, strips, spheroids, hollow beads, toroids, pellets, tablets, or any other physical shape. Examples of elastomers may include, but are not limited to, polyisoprene, polybutadiene, polyisobutylene, polyurethane, a styrene-butadiene random copolymer, a styrene-butadiene block copolymer, acrylonitrilebutadiene copolymer, hydrogenated acrylonitrile-butadiene copolymer, acrylonitrile-styrene-butadiene copolymer, ethylene-propylene-diene monomer copolymer, and any combinations thereof.

In some embodiments, the elastomer material may be included in a cement slurry in an amount ranging from a lower limit of about 0%, 0.001%, 0.01%, 0.1%, 1%, 2%, 4%, 8%, or 10% by weight of the complete dry components of the cement slurry to an upper limit of about 20%, 18%, 16%, 14%, 12%, or 10% by weight of the complete dry components of the cement slurry, wherein the amount of the elastomer material may range from any lower limit to any upper limit and encompasses any subset therebetween.

Suitable weighting agents may be used to increase the density of a cement slurry described herein. Increasing the density may allow for balancing the hydrostatic pressure exerted by the cement slurry and the formation pore pressure to maintain well control and cement-sheath integrity. Weighting agents are high-specific gravity solid particulates and may include, but are not limited to, hausmannite ore, barite, hermatite ($Fe_2O_3$), calcium carbonate, siderite ($FeCO_3$), ilmenite ($FeO.TiO_2$), and any combination thereof. Any weighting agent suitable for use with the elastomers described herein may additionally be used as a weighting agent alone. Typically, the density of the weighting agents of the embodiments disclosed herein range from about 1.05 g/cm$^3$ to about 5.5 g/cm$^3$.

In some embodiments, the weighting agent may be included in a cement slurry in an amount ranging from a lower limit of about 0%, 0.001%, 0.01%, 0.1%, 1%, 2%, 4%, 6%, 8%, 10%, 12%, 14%, 18%, or 20% by weight of the complete dry components of the cement slurry to an upper limit of about 30%, 28%, 26%, 24%, 22%, or 20% by weight of the complete dry components of the cement slurry, wherein the amount of the weighting agent may range from any lower limit to any upper limit and encompasses any subset therebetween.

In some embodiments, a strength-stabilizing agent may be included in a cement slurry described herein. A strength-stabilizing agent may be used to aid in preventing strength retrogression and increased permeability of a cement at bottomhole temperature extremes, typically exceeding about 200° F. The strength-stabilizing agent may be capable of maintaining low permeability and high compressive strength in a cement sheath by imparting resistance against high temperatures that often can cause stability degradation of cement. Typical strength-stabilizing agents may include, but are not limited to, silica flour and silica fume.

In some embodiments, a strength-stabilizing agent may be included in a cement slurry in an amount ranging from a lower limit of about 0%, 0.001%, 0.01%, 0.1%, 5%, 10%, 15%, 20%, 25%, or 30% by weight of the complete dry components of the cement slurry to an upper limit of about 40%, 35%, or 30% by weight of the complete dry components of the cement slurry, wherein the amount of the strength-stabilizing agent may range from any lower limit to any upper limit and encompasses any subset therebetween.

Dispersants suitable for use in a cement slurry described herein may affect the cement's rheological properties and reduce its apparent viscosity. The dispersant may thus allow turbulent flow to be achieved at lower pumping rates, resulting in improved wellbore cleaning during pumping. Additionally, adequately dispersed cement slurries exhibit improved fluid-loss control. Examples of dispersants may include, but are not limited to, sulfonated styrene maleic anhydride copolymer, sulfonated vinyltoluene maleic anhydride copolymer, sodium naphthalene sulfonate condensed with formaldehyde, sulfonated acetone condensed with formaldehyde, lignosulfonates, and the like.

In some embodiments, a dispersant may be included in a cement slurry in an amount ranging from a lower limit of about 0%, 0.001%, 0.01%, 0.1%, 0.5%, 1%, 1.5%, or 2% by weight of the complete dry components of the cement slurry to an upper limit of about 4%, 3.5%, 3%, 2.5%, or 2% by weight of the complete dry components of the cement slurry, wherein the amount of the dispersant may range from any lower limit to any upper limit and encompasses any subset therebetween.

Defoaming agents suitable for use in a cement slurry described herein may be used to prevent foaming of the cement slurry and its components. The defoaming agents may be capable of eliminating trapped air and preventing the formation of entrained air that could compress down hole. Foaming is of a particular concern when salt contamination from the formation is likely because a cement slurry that has foamed may exhibit cracks or spaces for which the salt can easily enter; defoaming agents minimize or eliminate these spaces. Examples of defoaming agents may include, but are not limited to, octyl alcohols, aluminum stearates, glycols, silicone, sulfonated hydrocarbons, fatty alcohols, fatty acid soaps, fatty acid esters, ethylene bis stearamides, derivatives thereof, and any combination thereof.

In certain embodiments, the defoaming agent may be present in an amount of about 0.01% to about 2% by weight of the dry cementitious material. In preferred embodiments, the defoaming agent may be included in a cement slurry in an amount ranging from a lower limit of about 0%, 0.001%, 0.01% 0.02%, 0.03%, 0.04%, or 0.05% by weight of the complete dry components of the cement slurry to an upper limit of about 2%, 1%, 0.5%, 0.1%, 0.09%, 0.08%, 0.07%, 0.06%, or 0.05% by weight of the complete dry components of the cement slurry, wherein the amount of the defoaming agent may range from any lower limit to any upper limit and encompasses any subset therebetween.

Other additives suitable for use in a cement slurry described herein may include set accelerators, set retarders, and the like.

Any aqueous base fluid suitable for use in a subterranean operation (e.g., drilling or completion operations) may be used in a cement slurry described herein. Suitable base fluids may include, but are not limited to freshwater, saltwater (e.g., water containing one or more salts dissolved therein), brine (e.g., saturated saltwater), seawater, and any combination thereof. Generally, the base fluid may be from any source, provided, for example, that it does not contain an excess of compounds that may undesirably affect other components in the cement slurry.

In some embodiments, the base fluid may be included in an amount sufficient to form a pumpable slurry. Generally, the base fluid is added to balance the remaining ingredients rather than in a certain weight percentage. However, in some embodiments, the base fluid may be included in a cement slurry in an amount ranging from a lower limit of about 30%, 40%, 50%, 60%, 70%, 80%, 90%, 100%, 110%, and 120% by weight of the complete dry components of the cement slurry to an upper limit of about 200%, 190%, 180%, 170%, 160%, 150%, 140%, 130%, and 120% by weight of the complete dry components of the cement slurry, wherein the amount of the base fluid may range from any lower limit to any upper limit and encompasses any subset therebetween. In some embodiments, the base fluid may be included in an amount of about 30% by weight of the complete dry components of the cement slurry to about 150% by weight of the complete dry components of the cement slurry.

The rheological properties of a cement slurry may affect the slurry's gelation, flowability, and stability and, ultimately, its end-use performance. A cement slurry is generally considered adequate for use in subterranean operations and sufficiently pumpable when it exhibits a plastic viscosity ("PV") of less than about 500 cP and a yield point ("YP") of less than about 200 lb/100 ft$^2$, as defined by the conventional Bingham Plastic viscosity model. In some embodiments, a cement slurry described herein has a PV of less than about 500 cP and a YP of less than about 30 lb/100 ft$^2$. In other embodiments, a cement slurry described herein may have a PV in the range of a lower limit of about 120 cP, 140 cP, 160 cP, 180 cP, 200 cP, 220 cP, 240 cP, 260 cP, 280 cP, and 300 cP to an upper limit of about 500 cP, 480 cP, 460 cP, 440 cP, 420 cP, 400 cP, 380 cP, 360 cP, 340 cP, 320 cP, and 300 cP and a YP in the range of a lower limit of about 5 lb/100 ft$^2$, 25 lb/100 ft$^2$, 50 lb/100 ft$^2$, 75 lb/100 ft$^2$, and 100 lb/100 ft$^2$ to an upper limit of about 200 lb/100 ft$^2$, 175 lb/100 ft$^2$, 150 lb/100 ft$^2$, 125 lb/100 ft$^2$, and 100 lb/100 ft$^2$.

The cement slurries described herein that include salt-tolerant fluid loss additives may be useful in cementing operations in subterranean formation that include sodium salts, potassium salts, magnesium salts, calcium salts, or any combination thereof.

Some embodiments may involve introducing a cement slurry described herein that includes salt-tolerant fluid loss additives into a wellbore penetrating a subterranean formations and setting the cement slurry therein to form a set cement. In some instances, the set cement may be a cement sheath disposed in an annular space between a casing and a wellbore wall. In some instances, the set cement may be a cement plug in the wellbore. In some instances, the cement slurry may be used to plug cracks or holes in an existing downhole set cement or pipe string.

In various embodiments, systems configured for preparing, transporting, and delivering the salt-tolerant cement slurries described herein to a downhole location are described. In various embodiments, the systems can comprise a pump fluidly coupled to a tubular (e.g., a casing, drill pipe, production tubing, coiled tubing, etc.) extending into a wellbore penetrating a subterranean formation, the tubular may be configured to circulate or otherwise convey a cement slurry described herein that includes salt-tolerant fluid loss additives. The pump may be, for example, a high pressure pump or a low pressure pump, which may depend on, inter alfa, the viscosity and density of the cement slurry, the type of the cementing operation, and the like.

In some embodiments, the systems described herein may further comprise a mixing tank arranged upstream of the pump and in which the cement slurry is formulated. In various embodiments, the pump (e.g., a low pressure pump, a high pressure pump, or a combination thereof) may convey the cement slurry from the mixing tank or other source of the cement slurry to the tubular. In other embodiments, however, the cement slurry can be formulated offsite and transported to a worksite, in which case the cement slurry may be introduced to the tubular via the pump directly from a transport vehicle or a shipping container (e.g., a truck, a railcar, a barge, or the like) or from a transport pipeline. In yet other embodiments, the cementing fluid may be formulated on the fly at the well site where components of the cementing fluid are pumped from a transport (e.g., a vehicle or pipeline) and mixed during introduction into the tubular. In any case, the cement slurry may be drawn into the pump, elevated to an appropriate pressure, and then introduced into the tubular for delivery downhole.

FIG. 1 shows an illustrative schematic of a system that can deliver a cement slurry described herein that includes salt-tolerant fluid loss additives to a downhole location, according to one or more embodiments. It should be noted that while FIG. 1 generally depicts a land-based system, it is to be recognized that like systems may be operated in offshore locations as well. As depicted in FIG. 1, system 1 may include mixing tank 10, in which cement slurry described herein may be formulated. Again, in some embodiments, the mixing tank 10 may represent or otherwise be replaced with a transport vehicle or shipping container configured to deliver or otherwise convey the cementing fluid to the well site. The cement slurry may be conveyed via line 12 to wellhead 14, where the cement slurry enters tubular 16 (e.g., a casing, drill pipe, production tubing, coiled tubing, etc.), tubular 16 extending from wellhead 14 into wellbore 22 penetrating subterranean formation 18. Upon being ejected from tubular 16, the cement slurry may subsequently return up the wellbore in the annulus between the tubular 16 and the wellbore 22 as indicated by flow lines 24. In other embodiments, the cement slurry may be reverse pumped down through the annulus and up tubular 16 back to the surface, without departing from the scope of the disclosure. Pump 20 may be configured to raise the pressure of the cement slurry to a desired degree before its introduction into tubular 16 (or annulus). It is to be recognized that system 1 is merely exemplary in nature and various additional components may be present that have not necessarily been depicted in FIG. 1 in the interest of clarity. Nonlimiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

One skilled in the art, with the benefit of this disclosure, should recognize the changes to the system described in FIG. 1 to provide for other cementing operations (e.g., squeeze operations, reverse cementing (where the cement is introduced into an annulus between a tubular and the wellbore and returns to the wellhead through the tubular), and the like).

It is also to be recognized that the disclosed salt-tolerant cement slurries may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), wellbore projectiles (e.g., wipers, plugs, darts, balls, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. a method that includes introducing a cement slurry into a wellbore penetrating a subterranean formation, the cement slurry comprising: a base fluid and dry components that include a cementitious material, a pozzolanic material, a salt additive, and a salt-tolerant fluid loss additive, wherein the salt-tolerant fluid loss additive includes at least one zwitterionic polymer selected from the group consisting of: (1) a copolymer of at least one anionic monomer and at least one cationic monomer, (2) a copolymer of at least one anionic monomer, at least one cationic monomer, and at least one zwitterionic monomer, (3) a homopolymer of a zwitterionic monomer, or (4) a copolymer of at least one zwitterionic monomer, wherein the at least one cationic monomer is selected from the group consisting of: [2-(methacryloyloxy)ethyl]trimethylammonium chloride, [3-(methacryloylamino)propyl]trimethylammonium chloride, [2-(acryloyloxy)ethyl]trimethylammonium chloride, [3-(acryloylamino)propyl]trimethylammonium chloride, [2-(methacryloyloxy)ethyl]dimethylamine hydrochloride, [3-(methacryloylamino)propyl]dimethylamine hydrochloride, [2-(acryloyloxy)ethyl]dimethylamine hydrochloride, [3-(acryloylamino)propyl]dimethylamine hydrochloride, diallyldimethylammonium chloride, a bromide salt thereof, a sulfate salt thereof, a methyl sulfate salt thereof, an ethyl sulfate salt thereof, and a nitrate salt thereof, wherein the at least one anionic monomer is selected from the group consisting of: 2-acrylamido-2-methylpropanesulfonic acid, sodium 2-acrylamido-2-methylpropanesulfonate, 4-vinylbenzenesulfonic acid, sodium 4-vinylbenzenesulfonate, vinylsulfonic acid, sodium vinylsulfonate, allylsulfonic acid, sodium allylsulfonate, 3-sulfopropyl acrylate potassium salt, 3-sulfopropyl methacrylate potassium salt, N-sulfomethylacrylamide sodium salt, sodium 1-allyloxy-2-hydroxypropanesulphonate, a potassium salt thereof, a magnesium salt thereof, a calcium salt thereof, and an ammonium salt thereof, and wherein the zwitterionic monomer is selected from the group consisting of: [3-(methacryloylamino)propyl]dimethyl(3-sulfopropyl)ammonium hydroxide inner salt, [2-(methacryloyloxy)ethyl]dimethyl (3-sulfopropyl)ammonium hydroxide inner salt, and 2-(methacryloyloxy)ethyl 2-(trimethylammonio)ethyl phosphate; and setting the cement slurry in a portion of the wellbore, a portion of the subterranean formation, or both; and B. a composition that includes a base fluid and dry components that include: a cementitious material, a pozzolanic material, a salt additive, and a salt-tolerant fluid loss additive, wherein the salt-tolerant fluid loss additive includes at least one zwitterionic polymer selected from the group consisting of: (1) a copolymer of at least one anionic monomer and at least one cationic monomer, (2) a copolymer of at least one anionic monomer, at least one cationic monomer, and at least one zwitterionic monomer, (3) a homopolymer of a zwitterionic monomer, or (4) a copolymer of at least one zwitterionic monomer, wherein the at least one cationic monomer is selected from the group consisting of: [2-(methacryloyloxy)ethyl]trimethylammonium chloride, [3-(methacryloylamino)propyl]trimethylammonium chloride, [2-(acryloyloxy)ethyl]trimethylammonium chloride, [3-(acryloylamino)propyl]trimethylammonium chloride, [2-(methacryloyloxy)ethyl]dimethylamine hydrochloride, [3-(methacryloylamino)propyl]dimethylamine hydrochloride, [2-(acryloyloxy)ethyl]dimethylamine hydrochloride, [3-(acryloylamino)propyl]dimethylamine hydrochloride, diallyldimethylammonium chloride, a bromide salt thereof, a sulfate salt thereof, a methyl sulfate salt thereof, an ethyl sulfate salt thereof, and a nitrate salt thereof, wherein the at least one anionic monomer is selected from the group consisting of: 2-acrylamido-2-methylpropanesulfonic acid, sodium 2-acrylamido-2-methylpropanesulfonate, 4-vinylbenzenesulfonic acid, sodium 4-vinylbenzenesulfonate, vinylsulfonic acid, sodium vinylsulfonate, allylsulfonic acid, sodium allylsulfonate, 3-sulfopropyl acrylate potassium salt, 3-sulfopropyl methacrylate potassium salt, N-sulfomethylacrylamide sodium salt, sodium 1-allyloxy-2-hydroxypropanesulphonate, a potassium salt thereof, a magnesium salt thereof, a calcium salt thereof, and an ammonium salt thereof, and wherein the zwitterionic monomer is selected from the group consisting of: [3-(methacryloylamino)propyl]dimethyl(3-sulfopropyl)ammonium hydroxide inner salt, [2-(methacryloyloxy)ethyl]dimethyl (3-sulfopropyl)ammonium hydroxide inner salt, and 2-(methacryloyloxy)ethyl 2-(trimethylammonio)ethyl phosphate; and C. a system that includes a wellhead with a tubular extending therefrom and into a wellbore in a subterranean formation where an annulus is defined between the tubular and the wellbore; and a pump fluidly coupled to the tubular, wherein the tubular, the annulus, or both contain a cement slurry comprising: a base fluid, a cementitious material, a pozzolanic material, a salt additive, and a salt-tolerant fluid loss additive, wherein the salt-tolerant fluid loss additive includes at least one zwitterionic polymer selected from the group consisting of: (1) a copolymer of at least one anionic monomer and at least one cationic monomer, (2) a copolymer of at least one anionic monomer, at least one cationic monomer, and at least one zwitterionic monomer, (3) a homopolymer of a zwitterionic monomer, or (4) a copolymer of at least one zwitterionic monomer, wherein the at least one cationic monomer is selected from the group consisting of: [2-(methacryloyloxy)ethyl]trimethylammonium chloride, [3-(methacryloylamino)propyl]trimethylammonium chloride, [2-(acryloyloxy)ethyl]trimethylammonium chloride, [3-(acryloylamino)propyl]trimethylammonium chloride, [2-(methacryloyloxy)ethyl]dimethylamine hydrochloride, [3-(methacryloylamino)propyl]dimethylamine hydrochloride, [2-(acryloyloxy)ethyl]dimethylamine hydrochloride, [3-(acryloylamino)propyl]dimethylamine hydrochloride, diallyldimethylammonium chloride, a bromide salt thereof, a sulfate salt thereof, a methyl sulfate salt thereof, a ethyl sulfate salt thereof, and a nitrate salt thereof, wherein the at least one anionic monomer is selected from the group consisting of: 2-acrylamido-2-methylpropanesulfonic acid, sodium 2-acrylamido-2-methylpropanesulfonate, 4-vinylbenzenesulfonic acid, sodium 4-vinylbenzenesulfonate, vinylsulfonic acid, sodium vinylsulfonate, allylsulfonic acid, sodium allylsulfonate, 3-sulfopropyl acrylate potassium salt, 3-sulfopropyl methacrylate potassium salt, N-sulfomethylacrylamide sodium salt, sodium 1-allyloxy-2-hydroxypropanesulphonate, a potassium salt thereof, a magnesium salt thereof, a calcium salt thereof, and an ammonium salt thereof, and wherein the zwitterionic monomer is selected from the group consisting of: [3-(methacryloylamino)propyl]dimethyl(3-sulfopropyl)ammonium hydroxide inner salt, [2-(methacryloyloxy)ethyl]dimethyl (3-sulfopropyl)ammonium hydroxide inner salt, and 2-(methacryloyloxy)ethyl 2-(trimethylammonio)ethyl phosphate.

Each of embodiments A, B, and C may have one or more of the following additional elements in any combination: Element 1: wherein the at least one zwitterionic polymer is charge balanced; Element 2: wherein the salt-tolerant fluid loss additive is present in an amount of about 0.001% to about 2% by weight of the dry components; Element 3: wherein the cementitious material is a hydraulic cement; Element 4: wherein the cementitious material is present in an amount of about 5% to about 60% by weight of the dry components; Element 5: wherein the pozzolanic material is selected from the group consisting of silica fume, metakaolin, fly ash, diatomaceous earth, calcined diatomite, uncalcined diatomite, calcined fullers earth, pozzolanic clay, calcined volcanic ash, uncalcined volcanic ash, bagasse ash, pumice, pumicite, rice hull ash, natural zeolite, synthetic zeolite, slag, vitreous calcium aluminosilicate, and any combination thereof; Element 6: wherein the pozzolanic material is present in an amount of about 0.001% to about 60% by weight of the dry components; Element 7: wherein the salt additive is present in an amount of about 15% to about 40% by weight of the base fluid; and Element 8: wherein the cement slurry has a yield point in the range of about 5 to about 200 lb/100 ft$^2$ and a plastic viscosity in the range of about 120 to about 500 cP.

Each of embodiments A and C may further include Element 9: wherein the subterranean formation includes sodium salts, potassium salts, magnesium salts, calcium salts, or any combination thereof.

By way of non-limiting example, exemplary combinations applicable to A, B, C include: Element 1 in combination with Element 2; Element 1 in combination with at least one of Elements 3-4 and optionally at least one of Elements 5-6; Element 2 in combination with Element 7 and optionally Element 1; at least one of Elements 3-4 in combination with at least one of Elements 5-6 and optionally Element 2, Element 7, or both; Element 8 in combination with any of the foregoing; and Element 9 in combination with one of Elements 1-7. In some instances, Embodiment A or Embodiment C may further include one of the following combinations: Element 9 in combination with any of the foregoing combinations of Elements 1-8 and Element 9 in combination with one of Elements 1-8.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments described herein, the following examples of preferred or representative embodiments are given. In no way should the following examples be read to limit, or to define, the scope of the disclosure.

EXAMPLES

Example 1

Zwitterionic Polymer Synthesis

A 250 ml round bottom flask was fitted with an overhead stirrer, temperature controller, and nitrogen purge. The flask was charged with 100 ml of ISOPAR® C. (a synthetic branched alkane hydrocarbon solvent, available from ExxonMobil) and 0.75 g of SPAN® 60 (sorbitan stearate, available from Sigma-Aldrich). The mixture was stirred and heated to 95° F. to dissolve the surfactant. A 50% by weight monomer solution in water was prepared with a 1 to 1 molar ratio of anionic and cationic monomers.

The monomer solution was added to the flask and the stirring speed was increased to 250 rpm to form an emulsion. The mixture was heated to 176° F. Once the reaction commenced, the temperature was held at 176° F. for 1 hour. The mixture was cooled and poured into 200 ml of acetone. The flask was rinsed with 100 ml of acetone and the rinse was added to the product mixture.

The product was collected on a Büchner funnel, air dried, and the large clumps were ground to a powder with a mortar and pestle.

To synthesize poly([2-methacryloyloxy)ethyl]trimethylammonium chloride-co-sodium 2-acrylamido-2-methylpropanesulfonate) ("Polymer 1"), the following monomer solution was used.
  20.9925 g AMPS® 2403 (50% sodium 2A2MPS) (available from Lubrizol)
  11.8835 g [2-(methacryloyloxy)ethyl]trimethylammonium chloride, 80% (available from Sigma-Aldrich)
  7.29 g deionized water
  10.1 mg 2,2'-azobis(2-methylpropionamidine) dihydrochloride (available from Sigma-Aldrich)

To synthesize poly([[(3-methacryloylamino)propyl]trimethylammonium chloride-co-sodium 2-acrylamido-2-methylpropanesulfonate) ("Polymer 2"), the following monomer solution was used.
  10.1886 g AMPS® 2403
  9.8113 g [3-(methacryloylamino)propyl]trimethylammonium chloride, 50% (available from Sigma-Aldrich)

10.3 mg 2,2'-azobis(2-methylpropionamidine) dihydrochloride (available from Sigma-Aldrich)

Example 2

Cement Slurry Testing

A combination of 263.98 g tap water and 148.49 g NaCl was mixed in a blender at 2000 rpm for two minutes. The speed was increased to 4000 rpm and the dry components were added. The dry components include 351.82 g Class G Portland Cement, 124.76 g hausmannite ore ground to an average particle size of 5 microns, 128.08 g fly ash, 46.58 g coarse silica, 41.59 g WELLLIFE® 930 (a heavy weight elastomer, available from Halliburton Energy Services, Inc.), 12.47 g CFR-3™ (a dispersant, available from Halliburton Energy Services, Inc.), 1.25 g HALAD® 413 (a fluid loss intensifier, available from Halliburton Energy Services, Inc.), and 9.70 g of one of Polymer 1, Polymer 2, or a copolymer of 2-acrylamido-2-methylpropane sulfonic acid and diallyldimethylammonium chloride ("2A2MPS-co-DADMAC"). For a control sample, the foregoing was performed without Polymer 1, Polymer 2, or 2A2MPS-co-DADMAC.

The resulting slurry was mixed at 12,000 rpm for 35 sec and then conditioned in an atmospheric consistometer (preheated to 160° F.) for one hour. The slurry was returned to the blender jar and a mixture of 23.18 g $MgCl_2.6H_2O$ and 8.50 g KCl (1:1 molar ratio, 12% bwow) was added while mixing at 1000 rpm. The blender speed was increased to 3000 rpm and maintained for one minute after adding the salt mixture. The salt-contaminated slurry was conditioned at 160° F. for an additional 10 min in the atmospheric consistometer. The viscosity (Chandler 3550, standard spring, bob and sleeve) and static fluid loss were measured at 160° F. according to API RP 10B-2, $2^{nd}$ ed.

Table 1 provides the results of the static fluid loss and the viscosity measurements. Both Polymer 1 and Polymer 2 reduced fluid loss compared to a control without a zwitterionic polymer. Polymer 1 was more effective than 2A2MPS-co-DADMAC. Further, the PV for all cement slurries are within the range of being pumpable, and the YP for all cement slurries is sufficiently low that after being static, the cement slurry would still be pumpable.

TABLE 1

| Sample | API Fluid Loss (mL/30 min) | PV (cP) | YP (lb/100 ft²) |
| --- | --- | --- | --- |
| Control | 301* | 73 | 52 |
| 2A2MPS-co-DADMAC | 104* | 315 | 73 |
| Polymer 1 | 48 | 369 | 77 |
| Polymer 2 | 146* | 213 | 58 |

*Blow out occurred. Fluid loss calculated.

Therefore, the embodiments described herein are well adapted to attain the ends and advantages mentioned as well as those that are inherent therein. The particular embodiments disclosed above are illustrative only and may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the embodiments described herein. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

What is claimed is:

1. A method comprising:
 introducing a cement slurry into a wellbore penetrating a salt formation, the cement slurry comprising: a base fluid and dry components that comprise a cementitious material, a pozzolanic material, a salt additive, and a salt-tolerant fluid loss additive, wherein the salt-tolerant fluid loss additive is a zwitterionic polymer comprising:
  a copolymer of [3-(methacryloylamino)propyl]dimethyl (3-sulfopropyl)ammonium hydroxide inner salt and sodium 1-allyloxy-2-hydroxypropanesulphonate.

2. The method of claim 1, wherein the at least one zwitterionic polymer is charge balanced.

3. The method of claim 1, wherein the salt-tolerant fluid loss additive is present in an amount of about 0.001% to about 2% by weight of the dry components.

4. The method of claim 1, wherein the salt formation comprises sodium salts, potassium salts, magnesium salts, calcium salts, or any combination thereof.

5. The method of claim 1, wherein the cementitious material is a hydraulic cement.

6. The method of claim 1, wherein the cementitious material is present in an amount of about 5% to about 60% by weight of the dry components.

7. The method of claim 1, wherein the pozzolanic material is selected from the group consisting of silica fume, metakaolin, fly ash, diatomaceous earth, calcined diatomite, uncalcined diatomite, calcined fullers earth, pozzolanic clay, calcined volcanic ash, uncalcined volcanic ash, bagasse ash, pumice, pumicite, rice hull ash, natural zeolite, synthetic zeolite, slag, vitreous calcium aluminosilicate, and any combination thereof.

8. The method of claim 1, wherein the pozzolanic material is present in an amount of about 0.001% to about 60% by weight of the dry components.

9. The method of claim 1, wherein the salt additive is present in an amount of about 15% to about 40% by weight of the base fluid.

10. The method of claim 1, wherein the cement slurry has a yield point in the range of about 5 to about 200 lb/100 ft2 and a plastic viscosity in the range of about 120 to about 500 cP.

11. The method of claim 1 wherein the zwitterionic polymer further comprises at least one zwitterionic polymer selected from the group consisting of: (1) a copolymer of at least one anionic monomer and at least one cationic monomer, (2) a copolymer of at least one anionic monomer, at least one cationic monomer, and at least one zwitterionic monomer, (3) a homopolymer of a zwitterionic monomer, or (4) a copolymer of at least one zwitterionic monomer, wherein the at least one cationic monomer is selected from the group consisting of: [2-(methacryloyloxy) ethyl]trimethylammonium chloride, [3-(methacryloylamino)propyl]trimethylammonium chloride, [2-(acryloyloxy)ethyl]trimethylammonium chloride, [3-(acryloylamino)propyl]trimethylammonium chloride, [2-(methacryloyloxy)ethyl]dimethylamine hydrochloride, [3-(methacryloylamino)propyl]dimethylamine hydrochloride, [2-(acryloyloxy) ethyl]dimethylamine hydrochloride, [3-(acryloylamino)propyl]dimethylamine hydrochloride, a bromide salt thereof, a sulfate salt thereof, a methyl sulfate salt thereof, an ethyl sulfate salt thereof, and a nitrate salt thereof, wherein the at least one anionic monomer is selected from the group consisting of: sodium 2-acrylamido-2-methylpropanesulfonate, 4-vinylbenzenesulfonic acid, sodium 4-vinylbenzenesulfonate, vinylsulfonic acid, sodium vinylsulfonate, allylsulfonic acid, sodium allylsulfonate, 3-sulfopropyl acrylate potassium salt, 3-sulfopropyl methacrylate potassium salt, N-sulfomethylacrylamide sodium salt, sodium 1-allyloxy-2-hydroxypropanesulphonate, a potassium salt thereof, a magnesium salt thereof, a calcium salt thereof, and an ammonium salt thereof, and wherein the zwitterionic monomer is selected from the group consisting of: [3-(methacryloylamino)propyl]dimethyl(3-sulfopropyl)ammonium hydroxide inner salt, [2-(methacryloyloxy)ethyl]dimethyl(3-sulfopropyl) ammonium hydroxide inner salt, and 2-(methacryloyloxy)ethyl 2-(trimethylammonio)ethyl phosphate.

12. The method of claim 1 wherein the salt additive is sodium chloride, potassium chloride, or a combination thereof and wherein the salt additive is present in an amount of about 30% to about 40% by weight of the base fluid.

13. The method of claim 1, wherein the salt-tolerant fluid loss additive is present in an amount of about 2.6% to about 3% by weight of the dry components.

* * * * *